US00RE42795E

(19) United States
(12) Reissued Patent
Lee et al.

(10) Patent Number: US RE42,795 E
(45) Date of Reissued Patent: Oct. 4, 2011

(54) APPARATUS AND METHOD FOR RECORDING OR REPRODUCING DIGITAL DATA USING SPEED INFORMATION

(75) Inventors: Je Hyung Lee, Cupertino, CA (US); Soo Kyung Kim, Seoul (KR); Sang Joon Woo, Seoul (KR); Tae Seok Yang, Soengnam-Shi (KR)

(73) Assignee: LG Electronics Inc., Seoul (KR)

( * ) Notice: This patent is subject to a terminal disclaimer.

(21) Appl. No.: 12/411,339

(22) Filed: Mar. 25, 2009

Related U.S. Patent Documents

Reissue of:
(64) Patent No.: 5,587,789
Issued: Dec. 24, 1996
Appl. No.: 08/227,281
PCT Filed: Apr. 13, 1994

U.S. Applications:
(63) Continuation of application No. 11/798,311, filed on May 11, 2007, now Pat. No. Re. 41,611, which is a continuation of application No. 11/344,605, filed on Feb. 1, 2006, now Pat. No. Re. 41,042, which is a continuation of application No. 10/883,196, filed on Jul. 1, 2004, now Pat. No. Re. 41,125, which is a continuation of application No. 09/118,824, filed on Jul. 20, 1998, now Pat. No. Re. 38,868.

(30) Foreign Application Priority Data

Apr. 16, 1993 (KR) ..... 6441/1993

(51) Int. Cl.
*H04N 5/91* (2006.01)
*H04N 7/26* (2006.01)

(52) U.S. Cl. ..... 386/68; 386/80; 386/81; 386/95; 386/109

(58) Field of Classification Search ..... None
See application file for complete search history.

(56) References Cited

U.S. PATENT DOCUMENTS
3,944,728 A 3/1976 Ferrari
(Continued)

FOREIGN PATENT DOCUMENTS
DE 3437182 4/1986
(Continued)

OTHER PUBLICATIONS
Int's Organization for Standardization, ISO/IEC JTC1/SC29/WG11 MPEG 93/251, Mar. 1993, Jill Boyce et al. "Fast Scan Technology for MPEG Video Tape Recorders".

*Primary Examiner* — Thai Tran
*Assistant Examiner* — Heather R Jones
(74) *Attorney, Agent, or Firm* — Birch, Stewart, Kolasch & Birch, LLP

(57) ABSTRACT

[An apparatus and method for controlling recording and reproduction in a video cassette tape recorder are disclosed apparatus is capable of, in a recording mode, separating specific data for speed-varied reproduction from compressed digital video signals, recording them on designated tracks, recording position information of the designated tracks on a control track by an index head or recording position information of recording position-synchronized blocks at the starting portions of the designated tracks recorded with the specific data, and in a speed-varied reproduction mode, controlling a capstan servo speed so as to maintain the travel of a magnetic tape at a normal speed and periodically or non-periodically accelerate or decelerate it where specific data for varied-speed have been recorded periodically or non-periodically on predetermined portions of tracks, thereby making heads travel repeatedly at the normal speed and the high speed and thereby detect continuously the specific tracks for varied-speed. A repeatability of reproduced video at a varied speed is obtained without any deterioration in picture quality, because of recording of the specific data for speed-varied reproduction and the continuous detection of the specific data in the speed-varied reproduction.] *Apparatus and method for controlling*

*recording and/or reproduction of digital signals to and/or from a digital storage medium, are discussed. According to an embodiment, receiving the digital data, the digital data including video data compressed as at least one of intra-frame and predictive frame, stuffing data, synchronous signals, identification signals, and relative position information associated with an I-frame; detecting the synchronous signals and the identification signals for decoding the video data; obtaining the video data from the digital data by removing the stuffing data based on stuffing code information; determining a position associated with the I-frame by using the relative position information; determining whether a speed-varied reproduction mode is selected; and reproducing the video data based on the determined position associated with the I-frame, the synchronous signals, the identification signals, and a result of the step of determining whether the speed-varied reproduction mode is selected.*

5 Claims, 10 Drawing Sheets

U.S. PATENT DOCUMENTS

| | | | | | |
|---|---|---|---|---|---|
| 4,163,993 | A | | 8/1979 | Ravizza | |
| 4,185,305 | A | | 1/1980 | Perret et al. | |
| 4,293,880 | A | | 10/1981 | Tsukada et al. | |
| 4,323,930 | A | | 4/1982 | Chang | |
| 4,353,129 | A | * | 10/1982 | Nishiwaki | 375/363 |
| 4,428,004 | A | | 1/1984 | Mino | |
| 4,568,986 | A | | 2/1986 | Furuhata et al. | |
| 4,581,658 | A | | 4/1986 | Azuma et al. | |
| 4,651,227 | A | | 3/1987 | Yunoki et al. | |
| 4,663,673 | A | | 5/1987 | Doutsubo | |
| 4,761,694 | A | | 8/1988 | Shudo et al. | |
| 4,802,019 | A | | 1/1989 | Harada et al. | |
| 4,849,832 | A | | 7/1989 | Yamagata et al. | |
| 4,910,613 | A | | 3/1990 | Mabuchi et al. | |
| 5,057,949 | A | | 10/1991 | Suga et al. | |
| 5,065,258 | A | | 11/1991 | Warren et al. | |
| 5,070,419 | A | | 12/1991 | Kiyonaga | |
| 5,097,364 | A | | 3/1992 | Goto et al. | |
| 5,103,317 | A | | 4/1992 | Nomura | |
| 5,122,886 | A | | 6/1992 | Tanaka | |
| 5,126,852 | A | | 6/1992 | Nishino et al. | |
| 5,150,210 | A | | 9/1992 | Hoshi et al. | |
| 5,157,509 | A | | 10/1992 | Takimoto et al. | |
| 5,191,433 | A | | 3/1993 | Honjo | |
| 5,239,418 | A | | 8/1993 | Tyler et al. | |
| 5,239,429 | A | | 8/1993 | Hoshi | |
| 5,247,400 | A | | 9/1993 | Asai | |
| 5,251,074 | A | | 10/1993 | Hamma et al. | |
| 5,335,125 | A | | 8/1994 | Nakatsu et al. | |
| 5,406,382 | A | | 4/1995 | Adachi | |
| 5,428,393 | A | * | 6/1995 | Enokida | 348/390.1 |
| 5,438,458 | A | | 8/1995 | Honjo | |
| 5,450,209 | A | * | 9/1995 | Niimura et al. | 386/111 |
| 5,488,409 | A | | 1/1996 | Yuen et al. | |
| 5,504,585 | A | | 4/1996 | Fujinami et al. | |
| 5,507,949 | A | | 4/1996 | Ho | |
| 5,535,008 | A | | 7/1996 | Yamagishi et al. | |
| 5,587,789 | A | | 12/1996 | Lee et al. | |
| 5,589,993 | A | | 12/1996 | Naimpally | |
| 5,745,641 | A | | 4/1998 | De Haan et al. | |
| 5,907,446 | A | | 5/1999 | Ishii et al. | |
| 6,006,007 | A | | 12/1999 | Honjo | |

FOREIGN PATENT DOCUMENTS

| | | | |
|---|---|---|---|
| DE | 3831277 | | 3/1990 |
| DE | 4037178 | | 6/1991 |
| EP | 0461649 | | 12/1991 |
| EP | 0505985 | | 9/1992 |
| EP | 0513744 | | 11/1992 |
| JP | 4-318375 | A | 11/1992 |
| WO | WO-94/07332 | A1 | 3/1994 |

* cited by examiner

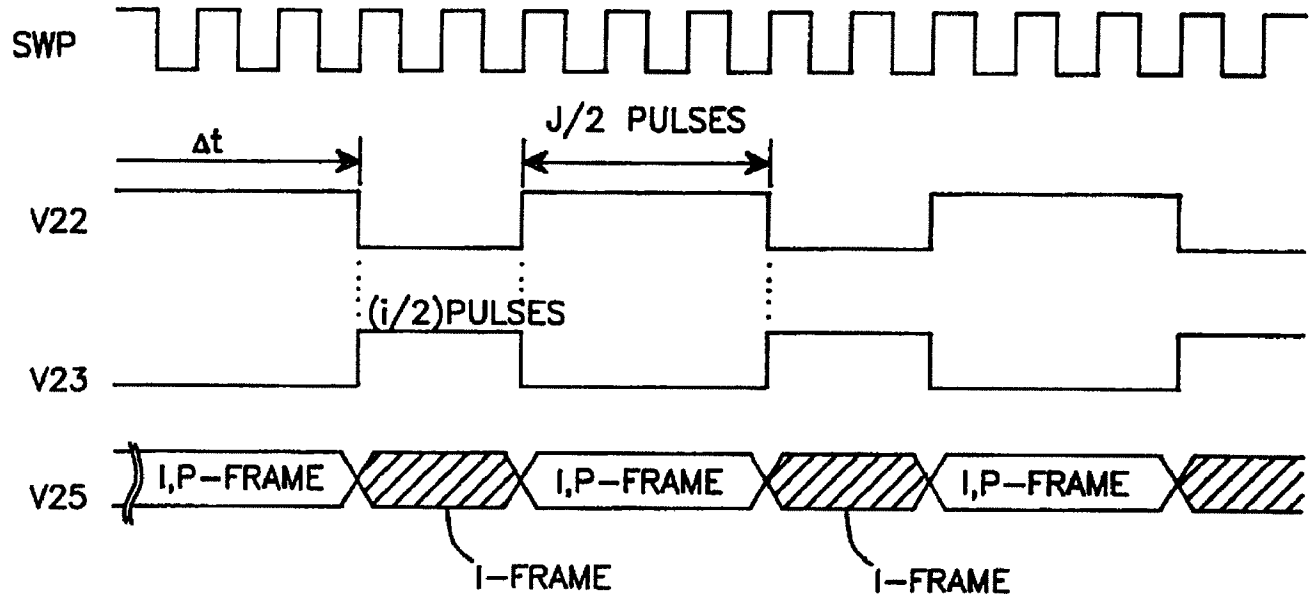
FIG .10A
FIG .10B
FIG .10C
FIG .10D
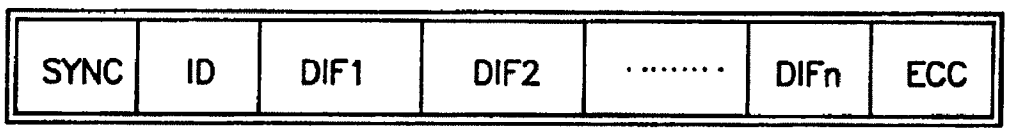
FIG .11

APPARATUS AND METHOD FOR RECORDING OR REPRODUCING DIGITAL DATA USING SPEED INFORMATION

Matter enclosed in heavy brackets [ ] appears in the original patent but forms no part of this reissue specification; matter printed in italics indicates the additions made by reissue.

*RELATED APPLICATION*

*The present application is a Continuation Application of Reissue application Ser. No. 11/798,311 filed May 11, 2007, now U.S. Pat. No. Re. 41,611, which is a Continuation Application of Reissue application Ser. No. 11/344,605 filed on Feb. 1, 2006 (now RE41,042), which is a Continuation Application of Reissue application Ser. No. 10/883,196 filed Jul. 1, 2004 (now RE41,125), which is a Continuation Application of Reissue Patent Re 38,868 (application Ser. No. 09/118,824 filed on Jul. 20, 1998) issued Nov. 8, 2005, which is a Reissue of U.S. Pat. No. 5,587,789 issued on Dec. 24, 1996, for which priority is claimed under 35 U.S.C. §120. The present application also claims priority of Application No. 6441/1993 filed in Republic of Korea on Apr. 16, 1993 under 35 U.S.C. §119. The entire contents of all are hereby incorporated by reference. Note: More than one reissue application has been filed for the reissue of U.S. Pat. No. 5,587,789. The reissue applications are application Ser. Nos. 09/118,824; 10/883,196; 11/344,605; 11/806,513; 11/902,928; 11/798,311; 12/411,333; and 12/411,339.*

BACKGROUND OF THE INVENTION

1. Field of the Invention

The present invention relates to a [circuit] device and method for controlling recording and reproduction in a digital [cassette tape] recorder, *and to an apparatus and method for recording or reproducing digital data to or from a digital storage medium using speed information and relative position information.*

2. Description of the Background Art

For analog/digital conversion for converting an analog video signal into a digital video signal and linear quantization, a signal transmission rate of about 100 Mega bits per second is typically required in the case of a normal TV broadcast signal such as NTSC, SECAM and PAL signals. On the other hand, a high definition TV (HDTV) signal with higher resolution than that of the normal TV broadcast signal requires a signal transmission rate higher than 100 Mega bits.

For achieving data transmission in a limited transmission band, digitalized video signals should be transmitted in the form compressed in accordance with the video data compression-technique. In the case of digital cassette tape recorders (digital VCRs) having a limitation on record bandwidth, signals recorded on a magnetic tape may be digital normal TV signals having the form of compressed signals or digital HDTV signals having the form of compressed signals.

Referring to FIG. 1, there is illustrated a conventional recording circuit for [such] a digital [VCR] *video recorder. Here, a digital VCR as one example of a digital video recorder is discussed.* As shown in FIG. 1, the recording circuit includes an interface 1 for converting a compressed digital video signal into a signal having the recordable form, an interleaving and channel-dividing circuit 2 for interleaving an output V1 from the interface 1 in a predetermined form to reduce burst error and channel-dividing it to be matched with the zero bandwidth of a recording channel, recording formatters 3A and 3B for respectively converting outputs V2 and V3 of the interleaving and channel-dividing circuit 2 to record formats each including a synchronous signal, an identification signal and redundancy bits for error correction codes, channel modulators 4A and 4B for modulating outputs V4 and V5 of the recording formatters 3A and 3B, respectively, recording amplifiers 5A and 5B for amplifying outputs V6 and V7 of the channel modulators 4A and 4B, respectively, a drum pulse generator 7 for outputting two pulses at every rotation of a head drum 6 caused by driving a drum motor M1, and switches SW1 and SW2 for performing their switching operations based on an output SWP from the drum pulse generator 7 to selectively transmit outputs V8 and V9 of the recording amplifiers 5A and 5B to heads HD1 (or HD3) and HD2 (or HD4), respectively. In FIG. 1, the reference numeral 8 denotes a guide pin, 10 a pinch roller, and 9 a capstan adapted to be rotated by a capstan motor M2.

FIG. 2 is a block diagram illustrating a conventional reproduction circuit for the digital [VCR] *recorder*. As shown in FIG. 2, the reproduction circuit includes reproduction amplifiers 11A and 11B for receiving outputs from selected heads HD1 (or HD3) and HD2 (or HD4) mounted on the head drum 6 via the switches SW1 and SW2 switched in accordance with the output SWP from the drum pulse generator 7 and amplifying them, respectively, equalizers 12A and 12B for compensating distortions of frequency characteristics of outputs V10 and V11 of the reproduction amplifiers 11A and 11B, respectively, channel demodulators 13A and 13B for demodulating outputs V12 and V13 of the equalizers 12A and 12B, respectively, sync-detecting and error-correcting circuits 14A and 14B for detecting synchronous signals SYNC added in a recorded signal from the outputs V14 and V15 of the channel demodulators 13A and 13B and correcting errors of the outputs V14 and V15, respectively, deinterleaving circuits 15A and 15B for deinterleaving outputs V16 and V17 of the sync-detecting and error-correcting circuits 14A and 14B into the original signal form, respectively, a deformatter 16 for recovering outputs V18 and V19 of the deinterleaving circuits 15A and 15B to the original signal format, and an interface 17 for converting an output V20 of the deformatter 16 into a reproduced digital signal Vo and outputting it.

Now, operations of the conventional circuits will be described in conjunction with FIGS. 1 to 6.

First, in a recording mode, a compressed HDTV signal or compressed normal TV signal is applied to the interface 1 which, in turn, converts the received signal into a signal V1 capable of being recorded and reproduced. The signal V1 is then interleaved into a predetermined form to reduce burst errors in the interleaving and channel-dividing circuit 2 which, in turn, outputs signals V2 and V3 channel-divided so as to be matched with the bandwidth of the recording channel.

The outputs V2 and V3 from the interleaving and channel-dividing circuit 2 are applied to the recording formatters 3A and 3B and then added with synchronous signals SYNC, identification signals ID and redundancy bits for error correction codes ECC in the recording formatters 3A and 3B. Resultant signals from the recording formatters 3A and 3B are then received in the channel modulators 4A and 4B which, in turn, output signals V6 and V7 matched with a predetermined recording format, respectively. The outputs V6 and V7 from the channel modulators 4A and 4B are applied to the recording amplifiers 5A and 5B which, in turn, amplify them, respectively.

Outputs V8 and V9 from the recording amplifiers 5A and 5B are applied to selected heads HD1 (or HD3) and HD2 (or HD4) via the switches SW1 and SW2 switched by the output SWP from the drum pulse generator 7, so that they are recorded on a [magnetic tape] *recording medium* in a recording format shown in FIG. 3.

In this case, the drum pulse generator 7 generates two pulses at every rotation of the head drum 6 driven by the drum motor M1.

Meanwhile, frames have a mixed form of intra-frames (I-frames) able to be independently decoded and predictive frames (P-frames) compressed by moving information of previous screen and unable to be independently decoded, in accordance with a video compression system for HDTV signals or an MPEG (Moving Picture Experts Group) system. Bit rate generated in each frame is non-uniform, as shown in FIG. 5.

In a reproduction mode, the magnetic tape travels by the rotation of the capstan 9 caused by the capstan motor M2 while being in contact with the head drum 6 rotating by the driving force of the drum motor M1. At this time, the heads HD1 (or HD3) and HD2 (or HD4) detect signals on the magnetic tape and send them to the reproduction amplifiers 11A and 11B via the switches SW3 and SW4 switched by the output SWP of the drum pulse generator 7, respectively.

The signals received in the reproduction amplifiers 11A and 11B are amplified to a predetermined level and then sent to the equalizers 12A and 12B which, in turn, output signals V12 and V13 having compensated frequency characteristics, respectively. The signals V12 and V13 from the equalizers 12A and 12B are then applied to the channel demodulators 13A and 13B, respectively, so as to be demodulated. Outputs V14 and V15 from the channel demodulators 13A and 13B are received in the sync-detecting and error-correcting circuits 14A and 14B which, in turn, detect respectively synchronous signals SYNC and identification signals ID from synchronous block of the received signals and remove error components included in the data.

Outputs V16 and V17 from the sync-detecting and error-correcting circuits 14A and 14B are applied to the deinterleaving circuit 15A and 15B which, in turn, deinterleave the signals V16 and V17 and thereby generate signals V18 and V19 having the original signal forms, respectively. The signals V18 and V19 are received in the deformatter 16 and thereby converted to the format having the signal form prior to recording. Signal V20 from the deformatter 16 is applied to the interface 17 which, in turn, generates a reproduced digital signal Vo.

In a speed-varied reproduction, the rotation speed of the head drum 6 is kept constant while the travel of the magnetic tape is accelerated. As a result, the heads HD1 to HD4 travel across tracks on the magnetic tape. The trace of the heads is shown in FIG. 3. Consequently, the detected signals have a discontinuous data form, namely, data burst with a magnitude inversely proportional to the travel speed of the magnetic tape.

In the case of existing analog [VCRs] *video recorders*, data of one field are recorded in one track in the reproduction order. Accordingly, regions on tracks from which data are detected in the speed-varied reproduction mode are directly associated with reproduction regions of a corresponding screen. Therefore, video reproduction in the speed-varied mode is possible even when a noise bar is generated due to data detected on an adjacent track.

In the case of existing digital [VCRs] *video recorders*, however, data of one field are recorded in a plurality of tracks, as shown in FIG. 3. As a result, reproduction bursts on adjacent tracks have no relation with the reproduction order. In this case, therefore, a frame memory and an addressing process for rearranging data detected are needed. Furthermore, there is a problem of an inevitable mosaic-shaped distortion of small segments due to discontinuous detection of data bursts.

For a video reproduction in the existing digital [VCRs] *video recorders*, data bursts detected should be independently decoded. However, these data bursts include unrecoverable other data on the screen or unrecoverable previous screen data, because the data bursts have the digital form compressed using the correlation between signals that may be the important factor of adversely affecting the picture quality in reproduction. The unrecoverable data can not be decoded and thereby reproduced in the form of videos. [In particular] *Further*, such a problem becomes more frequent in the case of data obtained from [the] *a* video compression system [such as the], *for example,* variable length coding involving non-uniform data lengths.

[In other words] *Moreover*, although data bursts detected from tracks on which data of the 0-th I-frame, the n-th I-frame, the 2n-th I-frame . . . are recorded can be constructed to a video, data bursts detected from tracks on which data of P-frames are recorded can not be constructed to a video.

SUMMARY OF THE INVENTION

Therefore, an object of the invention is to provide an apparatus and method for controlling recording and reproduction in a digital [VCR] *video recorder* capable of, in a recording mode, extracting independently-decodable data, namely, intra-frames from digital signals having a compressed form so as to record them on tracks designated with respect to a number of different [tape] speeds and, in a speed-varied reproduction mode, repeatedly performing a normal-speed travel and a high-speed travel of a [magnetic tape] *digital recording medium* so as to detect specific data for speed-varied reproduction periodically or non-periodically recorded on tracks of the magnetic tape, thereby reproducing videos with improved picture quality.

*Another object of the invention is to provide an apparatus and method for controlling recording and reproduction of digital data, which address the above noted limitations and other limitations associated with the related art.*

*Another object of the invention is to provide an apparatus and method for recording and reproducing digital data to and from a digital storage medium in an effective manner.*

In accordance with *an embodiment of* the present invention, [this object can be accomplished by providing] *there is provided* an apparatus for controlling recording and reproduction in a *digital* video [cassette tape] recorder comprising: *a* frame extracting [means] *unit* for buffering and amplifying compressed digital data input, and extracting specific data for a speed-varied reproduction from the compressed digital data; *a* frame recording position controlling [means] *unit* for calculating the number of tracks for the compressed digital data, selectively outputting a buffered and amplified output and the extracted specific data from [said] *the* frame extracting [means] *unit*, and outputting a multiplexing timing signal; *a* frame position information recording [means] *unit* for recording position information of tracks for a speed-varied reproduction and index information on a [magnetic tape] *recording medium*, based on the multiplexing timing signal; *a* digital recording [means] for recording the digital signals including the index information on the [magnetic tape] *recording medium*; *a* digital reproduction [means] for reproducing the digital signals recorded on the [magnetic tape] *recording medium*; *a* frame position information detecting [means] *unit* for detecting position information of specific tracks for the speed-varied reproduction and *an* index information [tape] speed controlling [means] *unit* for controlling the speed of a capstan motor, based on the detected index information and position information of the specific tracks; and *a* frame removing [means] for receiving therein the output from the digital reproduction [means] *unit* and removing unnecessary bit streams from the specific data.

*In accordance with another embodiment of the invention, there is provided a method for processing digital data, the method performed by at least one device and comprising: receiving the digital data, wherein the digital data includes video data compressed as at least one of intra-frame and predictive frame, stuffing data capable of being detected and removed, synchronous signals, identification signals, and at least one relative position information associated with an I-frame, wherein the relative position information indicates position information associated with the I-frame relative to position information associated with a current frame; detecting the synchronous signals and the identification signals for decoding the video data; obtaining the video data from the digital data by removing the stuffing data based on stuffing code information; determining a position associated with the I-frame by using the relative position information; determining whether a speed-varied reproduction mode is selected for reproduction of the video data in a varied speed; and reproducing the video data based on the determined position associated with the I-frame, the synchronous signals, the identification signals, and a result of the step of determining whether the speed-varied reproduction mode is selected.*

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects, features and advantages of the invention will become more apparent upon a reading of the following detailed specification and drawings which are given by way of illustration only, and thus are not limitative of the present invention, in which:

FIGS. 10A to 10D are waveform diagrams of signals generated in recording position control *in accordance with an embodiment of the present invention*;

FIG. 11 is a schematic view illustrating recording position-synchronized blocks in accordance with *an embodiment of* the present invention;

DETAILED DESCRIPTION OF THE PREFERRED EMBODIMENTS

Figure 7:
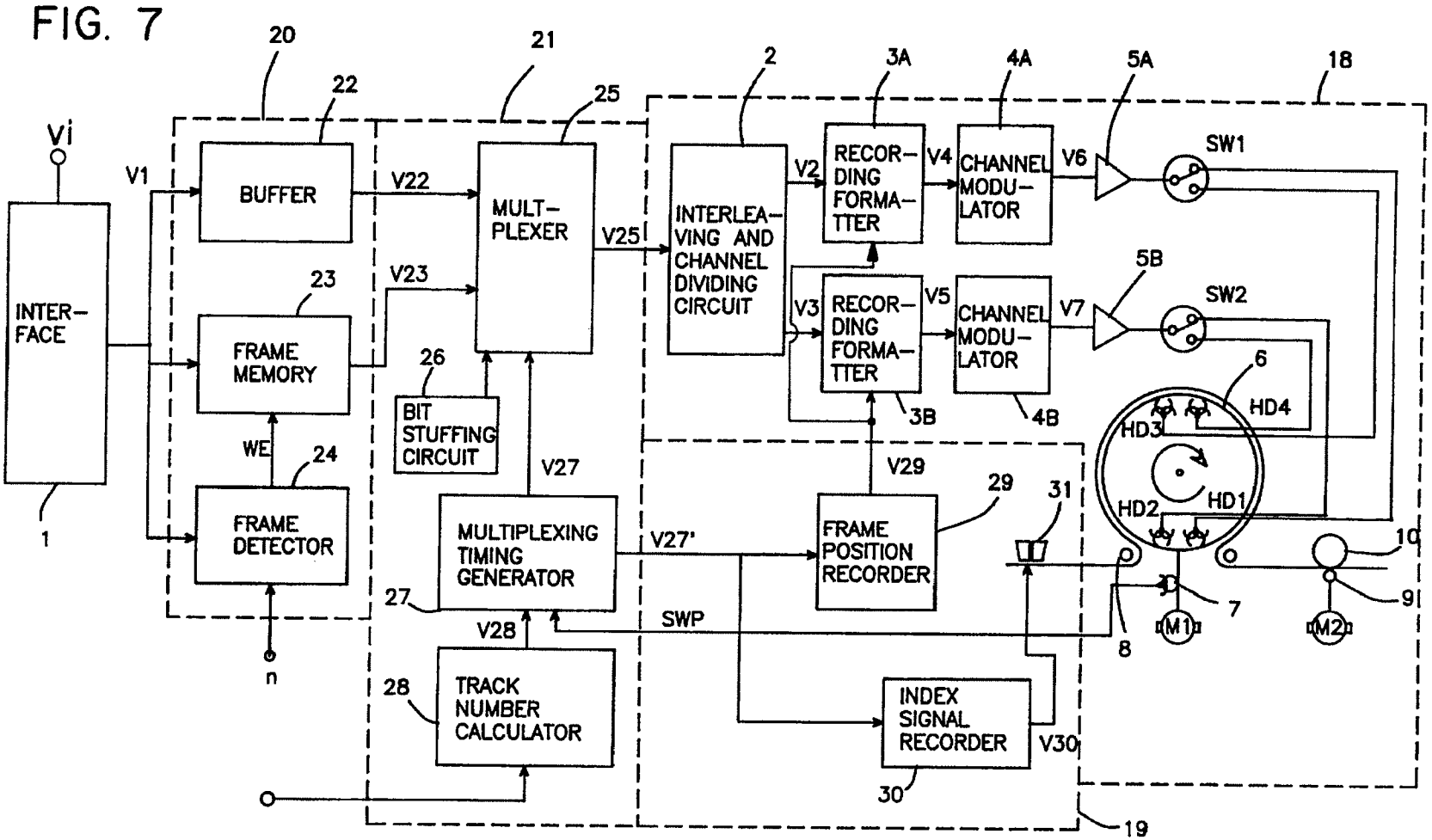
FIG. 7 is a block diagram of a recording control circuit for a digital [VCR] *video recorder* in accordance with an embodiment of the present invention.
Figure 8:
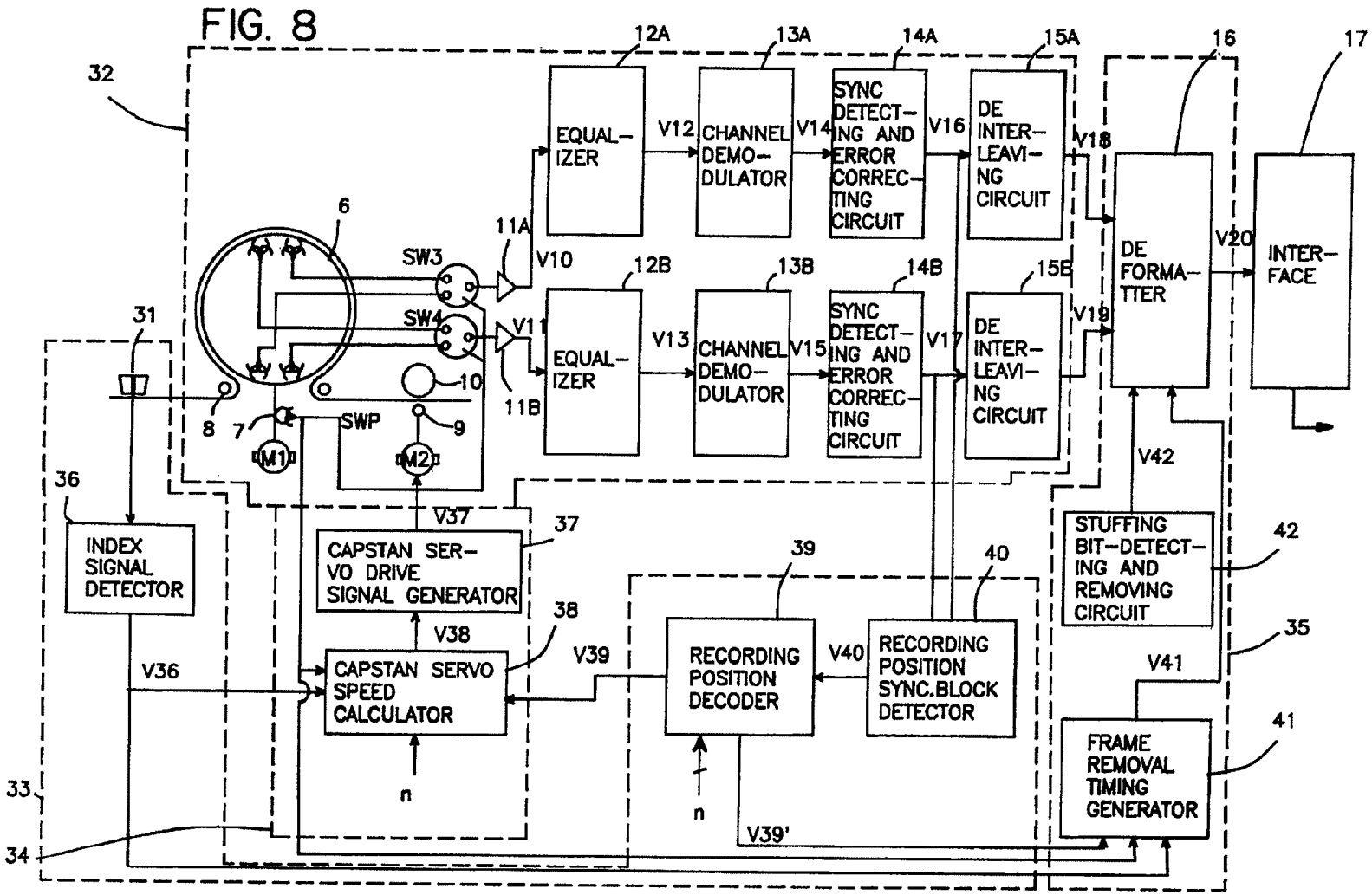
FIG. 8 is a block diagram of a reproduction control circuit for a digital [VCR] *video recorder* in accordance with an embodiment of the present invention.

Referring to FIGS. 7 and 8, there is illustrated an apparatus for controlling recording and reproduction *to and from a digital storage medium* in a digital [VCR] *video recorder* in accordance with an embodiment of the present invention. *An example of the digital video recorder is a digital VCR.*

FIG. 7 is a block diagram illustrating a recording control circuit device for a digital [VCR] *video recorder* in accordance with the present invention. As shown in FIG. 7, the recording control circuit device includes a frame extracting unit 20 for buffering and amplifying an output signal V1, namely, compressed digital data, of an interface 1, and extracting specific data for speed-varied reproduction from the received signal V1, a frame recording position controlling unit 21 for selectively outputting an output V22 of the frame extracting unit 20 obtained after the buffering and amplifying operations and the extracted specific data V23, and outputting a multiplexing timing signal V27', a frame position information recording unit 19 for recording track position information and index information for speed-varied reproduction on a [magnetic tape] *digital recording medium*, based on the multiplexing timing signal V27', and a digital recording unit for recording the digital data including the index information on the [magnetic tape] *digital recording medium*.

In similar to the conventional case, the digital recording unit 18 includes an interleaving and channel-dividing circuit 2, recording formatters 3A and 3B, channel modulators 4A and 4B, recording amplifiers 5A and 5B, a head drum 6 equipped with heads HD1 to HD4, a drum pulse generator 7 and switches SW1 and SW2. With this construction, the digital recording unit 18 records digital signals including index signals on the magnetic tape. For simplicity of the description, the description concerning the digital recording unit 18 will be omitted.

The frame extracting unit 20 includes a buffer 22 adapted to buffer the output signal V1 of the interface 1 and thereby amplify it to a predetermined level, a frame detector 24 adapted to detect specific data corresponding to an intraframe, and a frame memory 23 adapted to store the detected specific data.

The frame recording position controlling unit 21 includes a track number calculator 28 adapted to calculate the number of tracks, a multiplexing timing generator 27 adapted to operate an output SWP of the drum pulse generator 7 and thereby generate a multiplexing timing signal V27, a bit stuffing circuit adapted to make the output signal V23 of the frame memory 23 have a constant data length when the output signal V23 is at an underflow state, and a multiplexer 25 adapted to multiplex the output signals V22 and V23 of the frame extracting unit 20 and thereby output a signal V25.

On the other hand, the frame position information recording unit 19 includes a frame position recorder 29 adapted to receive the multiplexing timing signal V27' from the frame recording position controlling unit 21 and record, on the leading portion of a track for varied speed, position information of a next track for speed change, and an index signal recorder 30 adapted to record index information of a track to be scanned by an index head 31.

In FIG. 7, the reference numeral 8 denotes a guide pin, 9 a capstan engaged with a pinch roller 10, M1 a drum motor, and M2 a capstan motor.

FIG. 8 is a block diagram illustrating a reproduction circuit device in accordance with the present invention. As shown in FIG. 8, the reproduction circuit includes a digital reproduction unit 32 for reproducing compressed digital data recorded on [the] *a storage medium, for example a* magnetic tape, a frame position information detecting unit 33 for detecting index information from the magnetic tape and detecting information indicative of the position of a specific track, a [tape] speed controlling unit 34 for controlling the speed of the capstan motor M2, and a frame removing unit 35 for [a] removing specific data for speed-varied reproduction during a reproduction at a constant speed.

Figure 1:
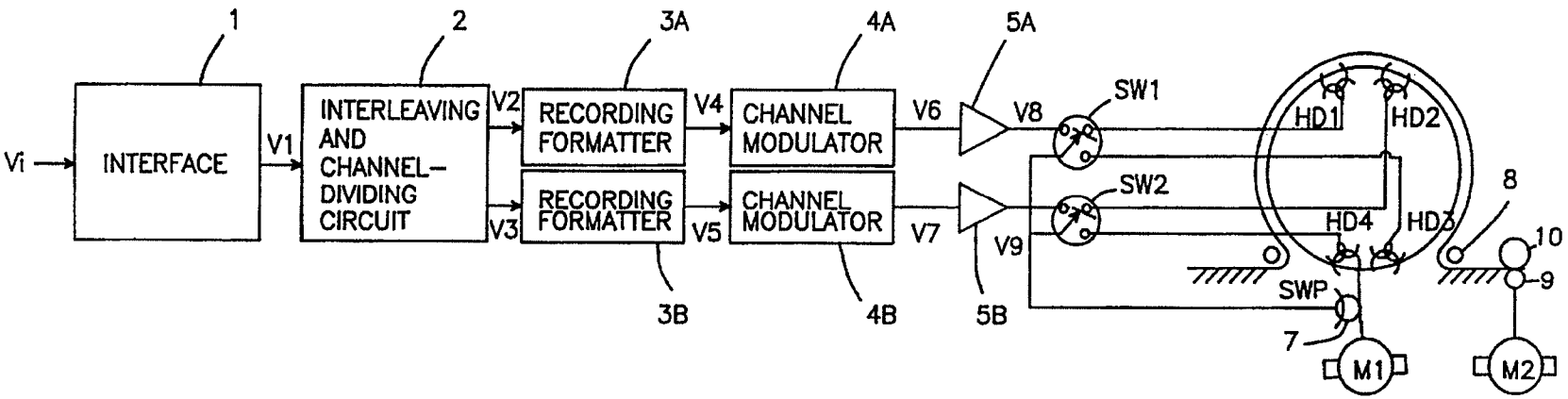
CONVENTIONAL ART FIG. 1
FIG. 1 is a block diagram of a conventional recording circuit for a digital [VCR] *video recorder*.
Figure 3:
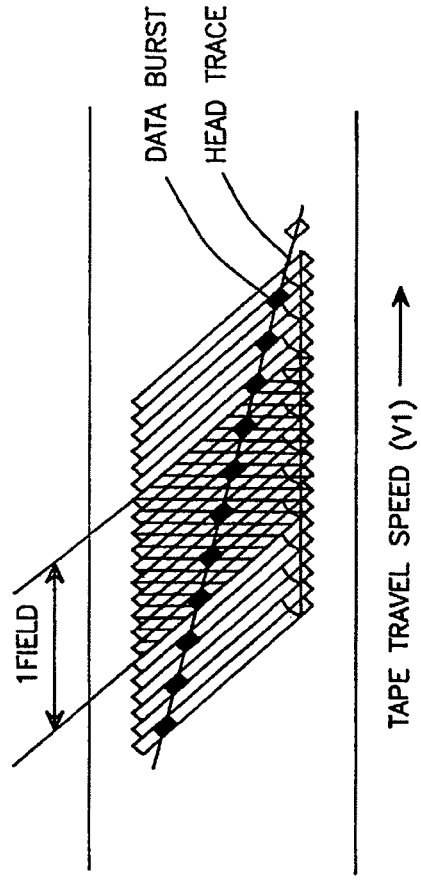
FIG. 3 CONVENTIONAL ART
FIG. 3 is a schematic view illustrating recording tracks of a [magnetic tape] *recording medium* and a trace of heads [travelling] *traveling* in a speed-varied reproduction mode in accordance with the conventional art.
Figure 2:
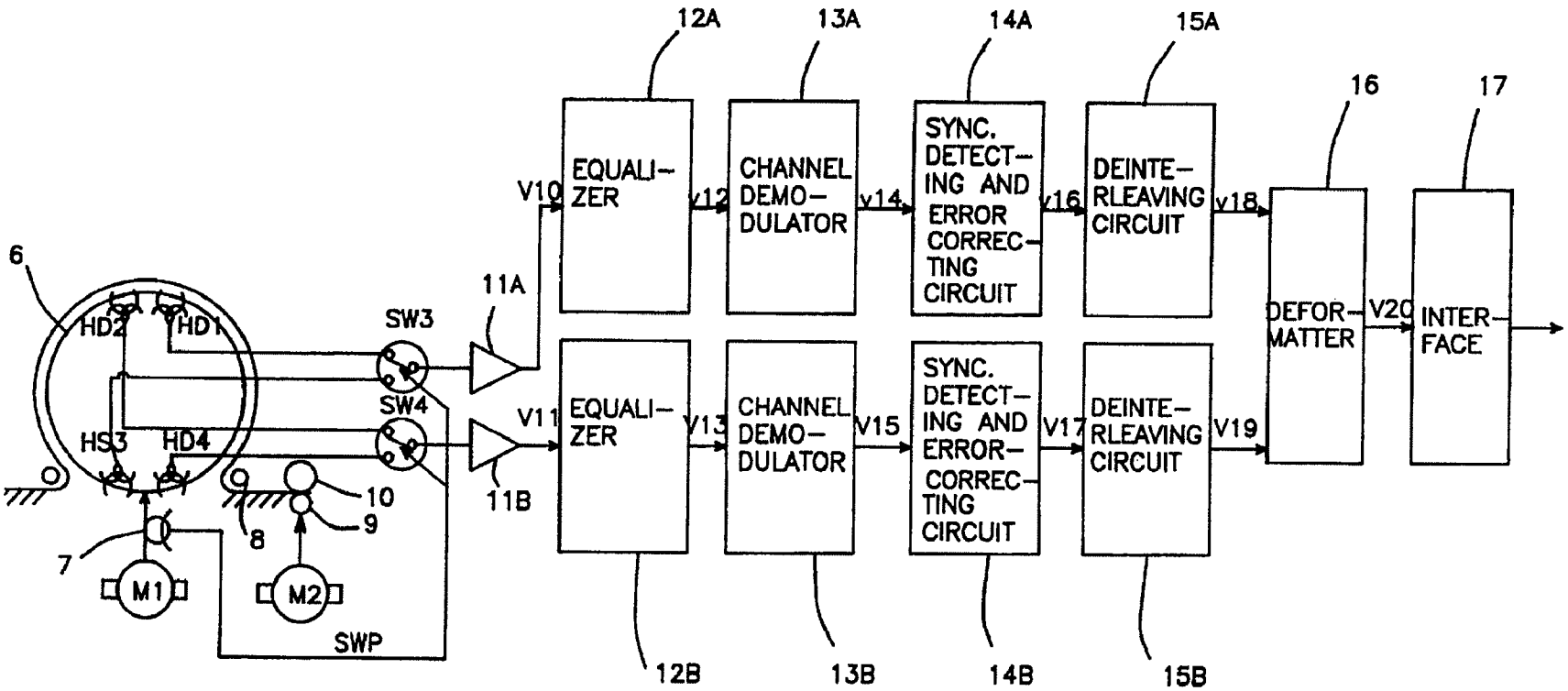
CONVENTIONAL ART FIG. 2
FIG. 2 is a block diagram of a conventional reproduction circuit for a digital [VCR] *video recorder*.

The digital reproduction unit 32 includes the head drum 6 equipped with the heads HD1 to HD4, the drum pulse generator 7, switches SW3 and SW4, reproduction amplifiers 11A and 11B, equalizers 12A and 12B, channel demodulators 13A and 13B, and sync-detecting and error-correcting circuit 14A and 14B. This construction of the digital reproduction unit 32 is similar to that of the conventional digital reproduction unit shown in FIG. 2. Therefore, the detailed description concerning the digital reproduction unit 32 will be omitted for simplicity of the description.

The frame position information detecting unit 33 includes an index signal detector 36 adapted to detect index information *from the storage medium*, a recording position-synchronized block detector 40 adapted to detect, from the outputs V16 and V17 of the sync-detecting and error-correcting units 14A and 14B, position information of a specific track including specific data recorded, and a recording position decoder 39 adapted to decode the detected position information.

The [tape] speed controlling unit 34 includes a capstan servo-speed calculating circuit 38 adapted to operate outputs V36 and V39 of the frame position frame detecting unit 33, and a drive signal generator 37 adapted to generate a drive signal V37 for controlling the speed of the capstan motor M2.

Finally, the frame removing unit 35 includes a frame removal timing generator 41 adapted to operate an output of the drum pulse generator 7 and outputs V36 and V39' of the frame position information detecting unit 33 and thereby generate a timing signal for removing specific data for speed-varied reproduction, a stuffing bit-detecting and removing circuit 42 adapted to detect and remove a stuffing bit added for preventing generation of the underflow of the frame memory 23, and a deformatter 16 adapted to convert an output of the digital reproduction unit 32 to the format having the signal form prior to recording.

Operations [of the apparatus] for controlling recording and reproduction in [the] *a recording/reproducing device, for example, a* digital VCR in accordance with *an embodiment of* the present invention will be described, in conjunction with FIGS. 4 to 14.

First, in a recording mode, an input signal Vi such as a compressed HDTV signal or compressed normal TV signal is applied to the interface 1 which, in turn, converts the received signal into a signal Vl having the form capable of being recorded and reproduced.

The signal V1 from the interface 1 is then applied to the frame extracting unit 20. In the frame extracting unit 20, the received signal V1 is buffered and amplified by the buffer 22. By the buffering and amplifying operations, the signal V1 is delayed for a predetermined time. The frame detector 24 detects compressed I-frames repeated at intervals of n frames, from a bit stream encoded to have frames with different compressed bit lengths. The frame memory 23 stores data of the detected I-frames.

Figure 4:
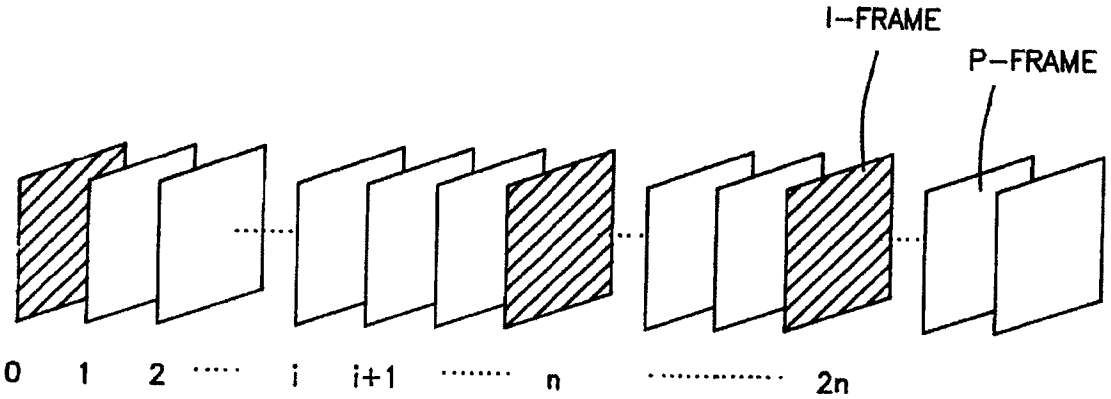
FIG. 4 is a schematic view illustrating a correlation among frames in accordance with a video compression system.
Figure 5:
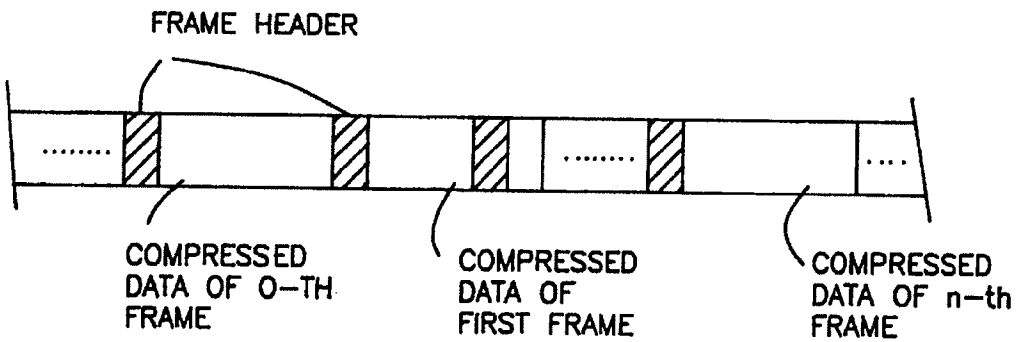
FIG. 5 is a schematic view illustrating an encoded bit stream.

In other words, compressed digital data of the I-frames repeatedly present at intervals of n frames are separated from the encoded bit stream shown in FIG. 4 and then duplicatively recorded on a specific track because they can be independently decoded. A write enable signal W/E of high level is applied to the frame memory 23 only for the period of detecting I-frames from the encoded bit stream by the frame detector 24. As a result, the frame memory 23 can store only the compressed video data of the I-frames.

Figure 12:
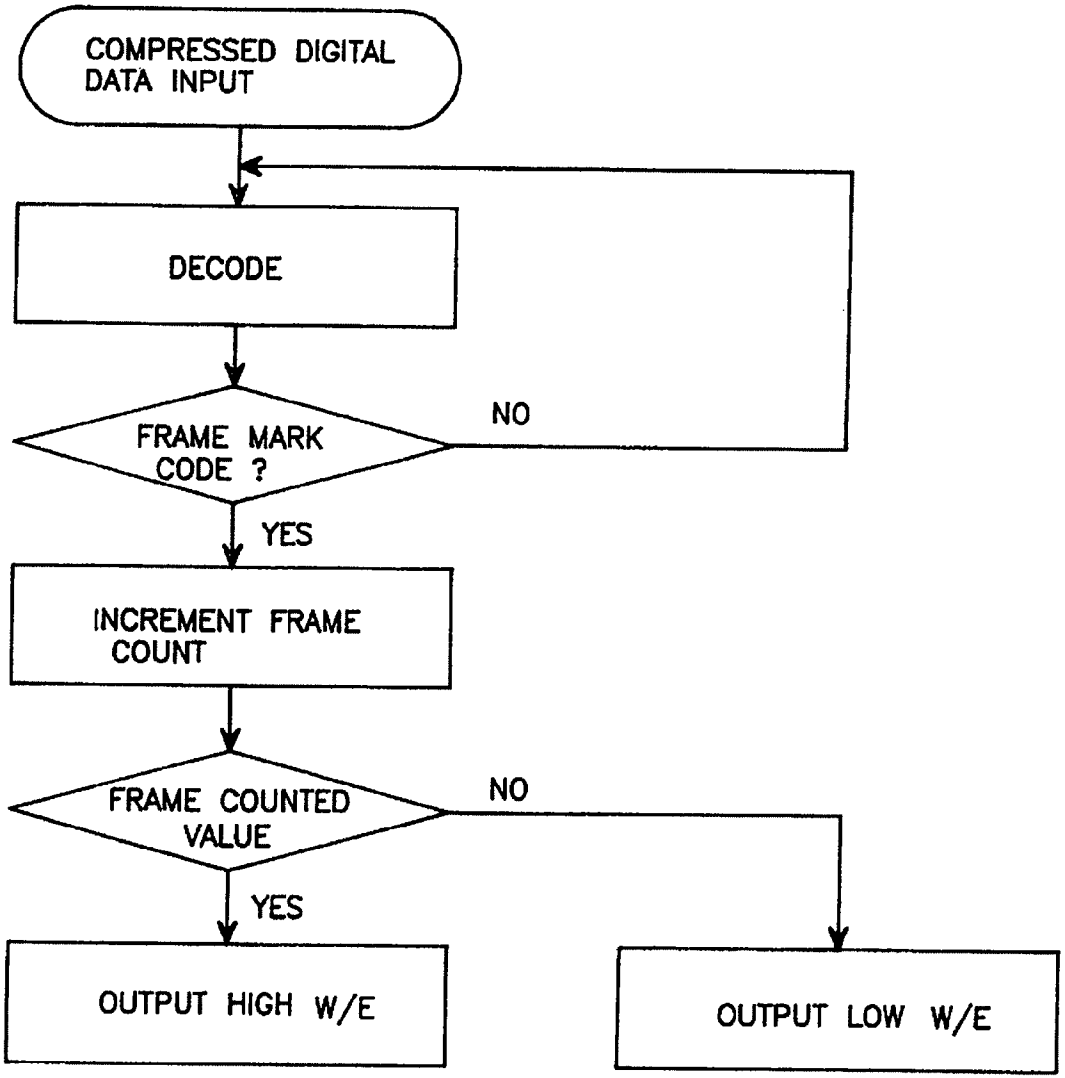
FIG. 12 is a flow chart illustrating a frame detection procedure in accordance with *an embodiment of* the present invention.

This procedure for detecting I-frames will be described in detail, in conjunction with FIG. 12. An input bit stream is received in the frame detector 24 and then decoded. The frame detector 24 detects a frame mark code from a header of each frame in the bit stream. When the frame mark code is detected, an increment in frame counted value is carried out. If I-frames are present at intervals of n frames, it is determined whether the number of counted frames equals a multiple of n (i.e., k*n, where k=0, 1, 2, . . . ). When the (n*k)th is detected, a write enable signal W/E of high level is applied to the frame memory 23, thereby enabling compressed digital data bits of a corresponding I-frame to be stored. When a next frame mark code is detected, a write enable signal W/E of low level is applied to the frame memory 23. As a result, it is possible to prevent frames of the frame bit stream other than I-frames from being stored.

Figure 9:
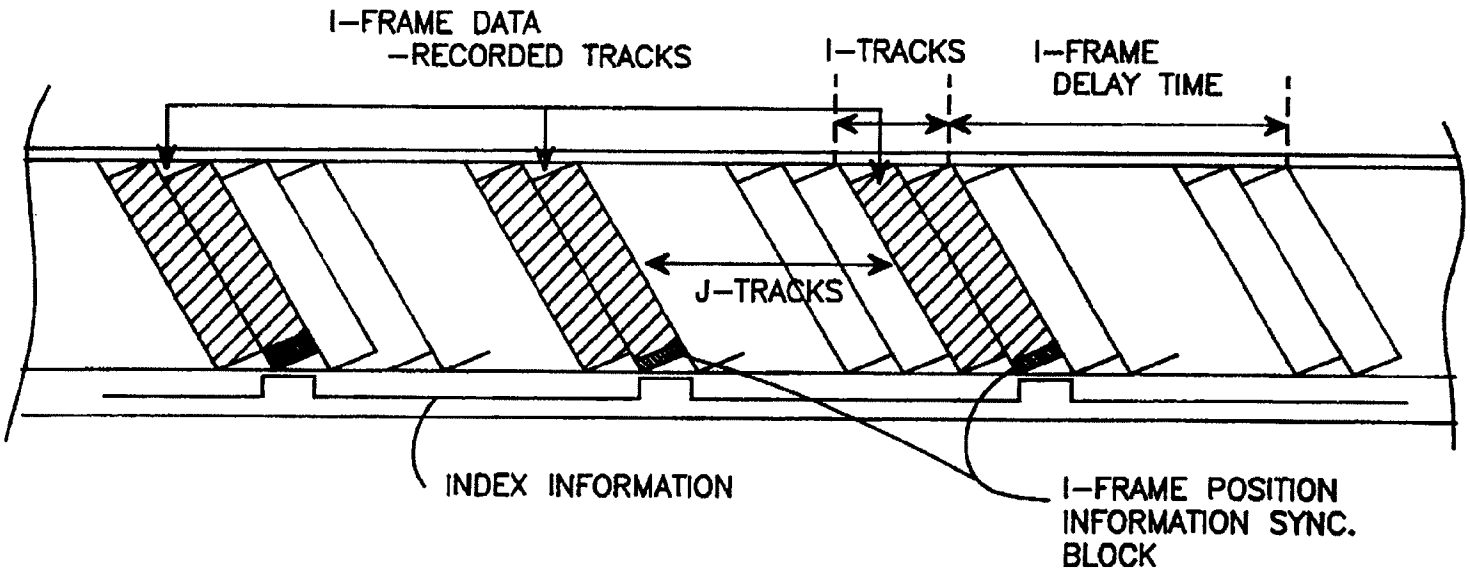
FIG. 9 is a schematic view illustrating recording tracks in accordance with *an embodiment of* the present invention.

The frame recording position controlling unit 21 sends selectively I-frame data V23 and record data V22 outputted from the frame extracting unit 20 to the digital recording unit 18 at a predetermined timing. Accordingly, a recording format shown in FIG. 9 is formed in the digital recording unit 18.

On the other hand, since the lengths of compressed data of frames are non-uniform, the frame memory 23 may encounter an underflow phenomenon that data stored in the frame memory 23 at the moment an I-frame is recorded in the frame memory 23 is insufficient or an overflow phenomenon that data stored in the frame memory 23 prior to recording of an I-frame is full.

This will be descried in detail. Assuming that the average bit rate of input data received in the interface 1 is R and the size of regions of the input data occupied by I-frames is $\alpha$, the average bit rate of data to be recorded is expressed by $R+\alpha R$. This average bit rate of data is calculated in the track number calculator 28. In this case, $\alpha$ can be calculated from $\alpha$=the number of tracks i for I-frames/ the number of tracks j for P-frames. Here, the number of tracks, i, is generally determined by the average bit rate of I-frames.

The multiplexing timing generator 27 operates an output V28 of the track number calculator 28 which calculates the number of I-frame tracks, i, and the number of P-frame tracks, j. The multiplexing timing generator 27 also operates the output SWP of the drum pulse generator 7. By these operations, a reference pulse is calculated. One pulse of the output SWP of the drum pulse generator 7 corresponds to a recording period for one track in a case of recording one-channel data and to a recording period for two tracks in a case of recording two-channel data. Accordingly, the multiplexing timing generator 27 outputs a switching signal V27 enabling the multiplexer 25 to selectively output data V23 for double speed stored in the frame memory 23 and normally-recorded data (FIG. 10B) buffered and amplified by the buffer 22, as shown in FIG. 10D.

In the output V22 from the buffer 22 shown in FIG. 10B, Δt represents the period for delaying outputting of I-frames present between the first recording track and a predetermined track so as to prevent an underflow phenomenon. In the worst case where an underflow phenomenon occurred in the frame memory 23, the bit stuffing unit 26 performs a bit stuffing operation for adding, to data of I-frames, escape synchronous codes and dummy bits capable of being detected in reproduction, so as to generate data having a constant length. On the other hand, where an overflow phenomenon occurred in the frame memory 23, a write enable signal W/E of low level is applied from the frame detector 24 to the frame memory 23 for a predetermined period.

In the frame position information recording unit 19, the frame position recorder 29 and the index signal recorder 30 receive the output V27' from the multiplexing timing signal generator 27 of the frame recording position controlling unit 21. The frame position recorder 29 outputs information V29 based on its frame position discrimination to the recording formatters 3A and 3B. Based on the information V29, the recording formatters 3A and 3B form a synchronous block including information indicative of the position of a track including a next I-frame recorded, in each video data region. The recording formatters 3A and 3B also record the recording position information in the first synchronous block recording position of the tracks including I-frames recorded, as shown in FIG. 9. Here, the recording position information represents the code converted from the number of tracks present between the track including the current I-frame recorded and the track including the next I-frame recorded, as shown in FIG. 11.

On the other hand, the index signal recorder 30 outputs index information V30, namely, a pulse indicative of whether an I-frame has been recorded or not, to the index head 31 which, in turn, records the index information V30 on a control track.

The above-mentioned overall operations will be described in detail. As the head drum 6 carrying the heads HD1 to HD4 is rotated by the driving force of the drum motor M1 while the magnetic tape engaged between the capstan 9 and the pinch roller 10 is fed by the driving force of the capstan motor M2, the interface 1 receiving the input signal Vi such as the compressed HDTV signal or the normal TV signal applies its output V1 to the frame extracting unit 20. Thereafter, the recorded data is buffered and amplified in the buffer 22 for a predetermined period while the I-frame data is stored in the frame memory 23 in accordance with the write enable signal W/E from the frame detector 24.

Subsequently, the multiplexer 25 receives selectively the output V22 from the buffer 22 and the output V23 from the frame memory 23, based on the output V27 from the multiplexing timing generator 27. As a result, the multiplexer 25 outputs the output signal V25 as shown in FIG. 10D to the digital recording unit 18. Thereafter, the interleaving and channel-dividing circuit 2 of the digital recording unit 18 interleaves the signal V25 to a predetermined form for reducing burst errors and then outputs signals V2 and V3 channel-divided to be matched with a recording channel bandwidth to the recording formatters 3A and 3B, respectively.

Figure 6:
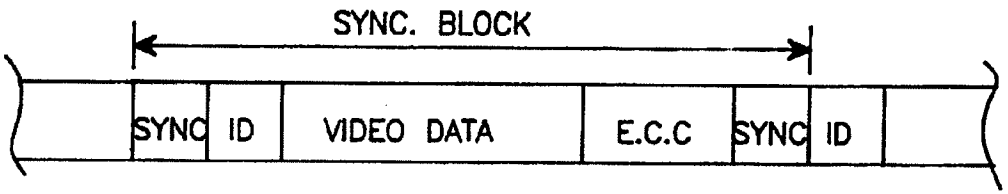
FIG. 6 is a schematic view illustrating synchronous blocks of a video signal for recording and reproduction.

Accordingly, the recording formatters 3A and 3B form synchronous blocks shown in FIG. 6 so as to add synchronous signals SYNC, identification signals ID and error correction codes ECC. The recording formatters 3A and 3B also form position information blocks of recording tracks, based on the output V29 from the frame position recorder 29 in the frame position information recording unit 19, thereby forming position information about the first synchronous blocks of the tracks including I-frames recorded.

Outputs V4 and V5 are converted to a predetermined recording format in the channel modulators 4A and 4B, amplified to a predetermined level by the recording amplifiers 5A and 5B, and then selectively sent to the heads HD1 (or HD3) and HD2 (or HD4) via the switches SW1 and SW2 switched by the output SWP of the drum pulse generator 7 generated by the rotation of the drum motor M1.

Thus, the outputs of the recording amplifiers 5A and 5B selectively applied to the heads HD1 (or HD3) and HD2 (or HD4) via the switches SW1 and SW2 being switched are recorded on the *storage medium, for example, a* magnetic tape in a recording format shown in FIG. 9.

On the other hand, when a speed-varied reproduction mode is selected in a case where the data of the recording format shown in FIG. 9 has been recorded on the *storage medium, for example, a* magnetic tape, the data recorded on the magnetic tape is reproduced in the digital reproduction unit 32. That is, signals recorded on the magnetic tape are detected by the heads HD1 (or HD3) and HD2 (or HD4) while the magnetic tape engaged between the capstan 9 and the pinch roller 10 rotated by the capstan motor M2 travels on the head drum 6 driven by the drum motor M1.

The signals detected by the heads HD1 (or HD3) and HD2 (or HD4) are sent to the reproduction amplifiers 11A and 11B via the switches SW3 and SW4 switched by the output SWP of the drum pulse generator 7, respectively. The signals received in the reproduction amplifiers 11A and 11B are amplified to a predetermined level and then sent to the equalizers 12A and 12B which, in turn, compensate distortions of frequency characteristics of the amplified signals V10 and V11, respectively. Resultant signals V12 and V13 from the equalizers 12A and 12B are then applied to the channel demodulators 13A and 13B which, in turn, demodulate the output signals V12 and V13 to the original signal forms, respectively.

Output signals V14 and V15 from the channel demodulators 13A and 13B are received in the sync-detecting and error-correcting circuits 14A and 14B which, in turn, detect respectively synchronous signals SYNC and identification signals ID from the received signals V14 and V15 and remove error components included in the recorded data. Resultant signals V16 and V17 from the sync-detecting and error-correcting circuits 14A and 14B are applied to the deinterleaving circuit 15A and 1513 which, in turn, deinterleave the signals V16 and V17 to the original signal forms, respectively. Resultant signals V18 and V19 are then sent to the deformatter 16 of the frame removing unit 35.

At this time, the frame position information detecting unit 33 detects index information recorded on a control track disposed at the lower edge of the magnetic tape by the index head 31. The index information is a pulse indicative of a track including an I-frame. On the other hand, the recording position-synchronized block detector 40 detects recording position-synchronized blocks recorded with I-frames from the outputs V16 and V17 of the sync-detecting and error-correcting circuits 14A and 14B. Upon detecting the index information in order to achieve a discrimination for the position of a specific track, the index signal detector 36 takes into consideration the time taken to control a speed matched with a speed multiple and calculated in the capstan servo speed calculator 38 of the [tape] speed controlling unit 34. The physical position of the index head 31 is determined by the processing speed of the capstan servo speed calculator 38.

The recording position-synchronized block detector 40 also detects the outputs V16 and V17 of the sync-detecting and error-correcting circuits 14A and 14B and separates recording position-synchronized blocks shown in FIG. 11 from the detected signals V15 and V17. The recording position-synchronized block detector 40 outputs a signal [40] *V40* which is indicative of codes relating to the speed multiple and selected from codes indicative of relative positions and present in the separated synchronous blocks. The recording position decoder 39 decodes the signal V40 received from the recording position-synchronized block detector 40 [and] *based on* the speed multiple n. An optional code DIFi present in each synchronous block is a code indicative of the number of tracks present between the current track and the i-th track including specific data recorded.

Accordingly, the frame position information detecting unit 33 detects specific track position information periodically or non-periodically recorded and track position information about I-frames recorded in the recording position-synchronized blocks, taking into consideration the calculation time taken to control the speed of the capstan motor M2 and the driving time. In this connection, the capstan servo speed calculator 38 receives the position information V36 from the index signal detector 36 and the position information V39 from the recording position decoder 39 and thereby calculates the rotation speed of the capstan motor M2 in accordance with the input speed multiple n. Resultant signal V38 from the capstan servo speed calculator 38 is then applied to the capstan servo driving signal generator 37 which, in turn, controls the speed of the capstan motor M2 so that the capstan motor M2 can be driven repeatedly at a normal speed and a high speed. As a result, the heads HD1 to HD4 mounted on the drum 6 repeatedly travel at the normal speed on specific tracks of the magnetic tape and jump travel on other tracks, thereby enabling reproduction of speed-varied videos.

Figure 13A:
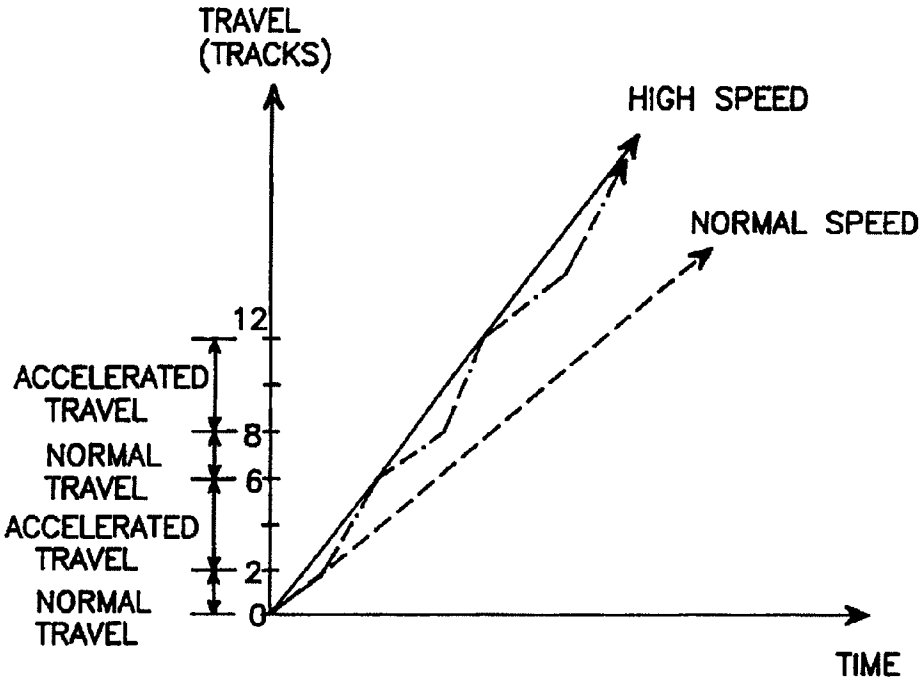
FIGS. 13A to 13C illustrate a capstan servo speed control in accordance with *an embodiment of* the present invention.
Figure 13B:
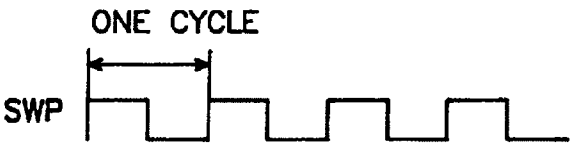
Figure 13C:
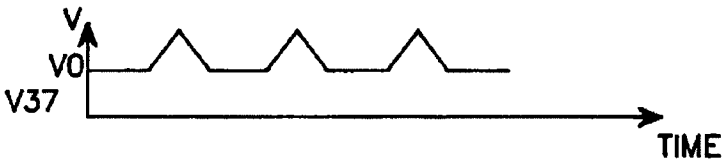
Figures 14A, 14B, 14C, 14D:
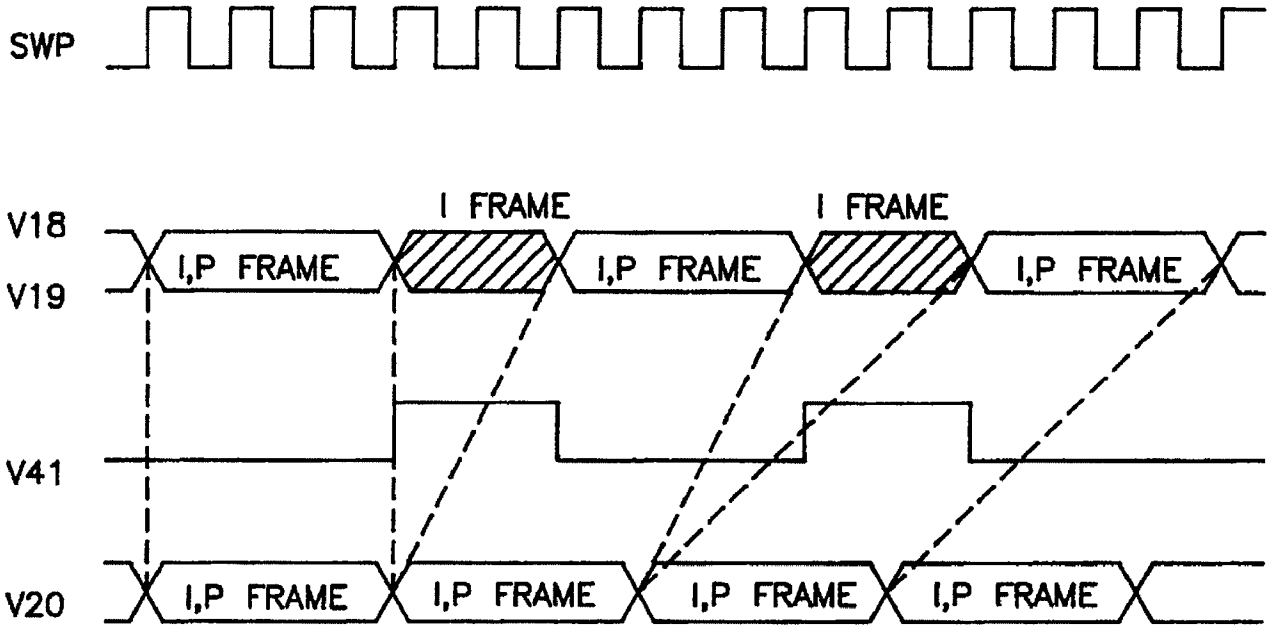
FIGS. 14A to 14D are waveform diagrams of signals generated in frame removal *in accordance with an embodiment of the present invention*.

FIGS. 13A to 13C illustrate an example of a capstan servo speed control in a case where speed-varied specific data have been recorded on every two-track at intervals of four tracks. In this case, the capstan motor M2 is driven two tracks at a normal speed in the same direction as the recording tracks for the first half of the initial cycle shown in FIG. 13B. For the next half of the initial cycle, the capstan motor M2 is driven four tracks at a high speed. During the accelerated driving, the capstan motor M2 exhibits the driving characteristic shown in FIG. 13A because the output V37 of the capstan servo driving signal generator 37 is periodically varied in level, as shown in FIG. 13C. By virtue of such a speed-varied driving of the capstan motor M2, it is possible to reduce an excessive characteristic of the capstan servo speed.

The outputs V18 and V19 from the digital reproduction unit 32 resulted from the speed-varied reproduction are sent to the deformatter 16 of the frame removing unit 35, converted into the signal form prior to the recording, and then outputted as a speed-varied reproduced signal Vo such as a digital HDTV signal or a normal TV signal via the interface 17.

For the signal conversion in the deformatter 16, it is required to remove the stuffing bits or dummy bits added for preventing the underflow phenomenon of the frame memory 23 upon recording data for varied speed on specific tracks. To this end, the stuffing bit-detecting and removing circuit 42 supplies a bit removing signal V42 for preventing any bit string from being outputted to the interface 17 when a stuffing synchronous code recorded at the starting portion of stuffing bits is detected. The supplying of the bit removing signal V42 is continued until a stuffing bit end code is detected.

In the reproduction at the normal speed, the frame removing unit 35 also separates data of recording tracks for varied speed so that the I-frame data recorded on the magnetic tape for the speed-varied reproduction is prevented from being outputted to the interface 17 and thereby being included in the reproduced signal Vo.

On the other hand, the frame removal timing generator 41 receives position information of tracks recorded with specific data for varied speed from both the recording position decoder 39 and the index signal detector 36 of the frame position information detecting unit 33. Based on the output SWP of the drum pulse generator 7 shown in FIG. 14A, the frame removal timing generator 41 then outputs a frame removing signal V41 shown in FIG. 14C to the deformatter 16.

Based on the frame removing signal V41, the deformatter 16 removes I-frame data from the signals V18 and V19 (FIG. 14B) received from the deinterleaving circuits 15A and 15B of the digital reproduction unit 32. As a result, the deformatter 16 outputs a signal V20 shown in FIG. 14D, thereby enabling the reproduction at the normal speed.

[As apparent from the above description, the present invention provides an apparatus for controlling recording and reproduction in a magnetic VCR capable of separating specific data for a speed-varied reproduction from compressed digital video signals and recording them on designated tracks in a recording mode, recording position information of the designated tracks on a control track by an index head or recording position information of recording position-synchronized blocks at the starting portions of the designated tracks recorded with the specific data so as to accurately scan the designated tracks in a reproduction mode, controlling a capstan servo speed so as to maintain the travel of a magnetic tape at a normal speed and periodically or non-periodically accelerate or decelerate it where specific data for varied-speed have been recorded periodically or non-periodically on predetermined portions of tracks, thereby making heads travel repeatedly at the normal speed and the high speed and thereby detect continuously the specific tracks for varied-speed. In accordance with the apparatus, the specific data for a speed-varied reproduction is removed in the reproduction at the normal speed. Thus, the reproduction at the normal speed can be accomplished.]

*Therefore, the embodiments of the present invention provide an apparatus and method for controlling recording and reproduction of digital data to and from a digital storage medium, which allow a speed-varied reproduction of the digital data in an effective manner using one or more of various information, for example, multiplexing timing information, synchronization information, varied speed information, index information, frame position information, etc.*

Accordingly, the present invention provides a repeatability of reproduced video at a varied speed without any deterioration in picture quality in that it enables recording of specific data for speed-varied reproduction *on a digital storage medium in an effective manner* and continuous detection of the specific data in the speed-varied reproduction *from the digital storage medium*.

Although the preferred embodiments of the invention have been disclosed for illustrative purposes, those skilled in the art will appreciate that various modifications, additions and substitutions are possible, without departing from the scope and spirit of the invention as disclosed in the accompanying claims. *For example, the teachings of the present invention are equally applicable to other suitable digital recording/*

*reproducing devices and digital storage mediums, and are not limited to the examples discussed above.*

What is claimed is:

[1. An apparatus for controlling recording and reproducing in a video cassette tape recorder comprising:

frame extracting means for buffering compressed digital data input thereto, and extracting specific data for a to speed-varied reproduction from said compressed digital data;

frame recording position controlling means for calculating a number of tracks for recording the compressed digital data and selectively outputting a buffered output, said extracted specific data from said frame extracting means, and a multiplexing timing signal;

frame position information recording means for recording position information of specific tracks for the speed-varied reproduction and index information on a magnetic tape, based on said multiplexing timing signal;

digital recording means for recording digital signals including said digital data and said index information on said magnetic tape;

digital reproduction means for reproducing the digital signals recorded on the magnetic tape;

frame position information detecting means for detecting said position information of the specific tracks for the speed-varied reproducing and said index information;

tape speed controlling means for controlling the speed of a capstan motor, based on said detected index information and said position information of the specific tracks; and frame removing means for receiving an output from the digital reproduction means and removing unnecessary bit streams from the specific data.]

[2. An apparatus in accordance with claim 1, wherein said frame extracting means comprises:

an interface for receiving said compressed digital data;

a buffer for buffering an output of said interface for a predetermined period;

a frame detector for detecting said specific data from said output of the interface and outputting a write enable signal; and a frame memory for selecting and storing the detected specific data, based on said write enable signal.]

[3. An apparatus in accordance with claim 2, wherein said frame detector counts a number of frames when a frame mark code is detected from a bit stream of said output of the interface, and enables said write enable signal when said counted number of frames is determined to be the same as an interval number at which I-frames are present.]

[4. An apparatus in accordance with claim 1, wherein said frame recording position controlling means comprises:

a track number calculator for calculating an average bit rate of said compressed digital data, the size of the specific data, a number of tracks for recording said specific data and a number of tracks present between said specific tracks;

a multiplexing timing generator for receiving an output from said track number calculator and outputting a switching signal for positioning the specific data on said specific tracks in accordance with a head switching signal;

a multiplexer for selecting an output from said frame extracting means, based on an output from said multiplexing timing generator and sending said selected output to said digital recording means; and a bit stuffing circuit for filling insufficient data with bit streams or dummy bits when said selected output of the frame extracting means is at an underflow state.]

[5. An apparatus in accordance with claim 1, wherein said frame position information recording means comprises:

a frame position recorder for receiving an output from said frame recording position controlling means and outputting position discrimination information to said digital recording means so as to record position information of a next specific track on an initial synchronous block of a track having said specific data recorded thereon; and an index signal recorder for recording position information of said track having said specific data recorded thereon on a control track of said magnetic tape by an index head.]

[6. An apparatus in accordance with claim 1, wherein said frame position information detecting means comprises:

an index signal detector for detecting index information recorded on a control track of said magnetic tape, said index information indicating whether tracks recorded with said specific data are present;

a recording position-synchronized block detector for detecting an output from said digital reproduction means and detecting recording position-synchronized blocks recorded with codes indicative of relative position information of said tracks recorded with said specific data; and a recording position decoder for decoding an output of said recording position-synchronized block detector, based on a number of different tape speeds, and thereby outputting a signal for calculating a capstan servo speed.]

[7. An apparatus in accordance with claim 1, wherein said tape speed controlling means comprises:

a capstan servo speed calculator for calculating a capstan servo speed for repeating a normal speed travel on said specific tracks and a high speed travel on tracks between adjacent specific tracks in a speed-varied reproduction by using the position information of the specific track from said frame position information detecting means based on a number of different tape speeds; and a capstan servo drive signal generator for controlling driving of said capstan motor, based on an output of said capstan servo speed calculator.]

[8. An apparatus in accordance with claim 1, wherein said frame removing means comprises:

a deformatter for converting an output of said digital reproduction means to a signal form prior to recording;

a stuffing bit-detecting and removing circuit for outputting a bit removing signal to said deformatter and removing stuffing bits or dummy bits added for preventing generation of an underflow of said frame extracting means in the speed-varied reproduction; and a frame removal timing generator for receiving said position information of the specific tracks from said frame position information detecting means and outputting a frame removing signal to the deformatter, based on a head switching signal, thereby preventing outputting of said specific data in a normal-speed reproduction.]

[9. An apparatus in accordance with claim 1, wherein said specific data includes I-frames.]

[10. An apparatus in accordance with claim 1, wherein said digital recording means and said digital reproduction means include a plurality of heads and switches for selectively recording and reproducing the digital signals.]

[11. An apparatus for controlling recording in a video cassette tape recorder comprising:

frame extracting means for receiving compressed digital data input thereto and extracting specific data for a speed-varied reproduction from said compressed digital data;

frame recording position controlling means for generating a multiplexing timing signal and multiplexing said compressed digital data and said extracted specific data from said frame extracting means based on said multiplexing timing signal;

frame position information recording means for recording index information and position information of specific tracks for recording said specific data for the speed-varied reproduction on a magnetic tape based on said multiplexing timing signal; and digital recording means for recording digital signals including said digital data and specific data from said frame recording position controlling means on the magnetic tape.]

[12. An apparatus in accordance with claim 11, wherein said frame extracting means includes:

an interface for receiving said compressed digital data;

a buffer for buffering an output of said interface for a predetermined period;

a frame detector for detecting said specific data from said output of the interface and outputting a write enable signal; and a frame memory for selecting and storing said specific data based on said write enable signal.]

[13. An apparatus in accordance with claim 12, wherein said frame detector starts counting frames when a frame mark code is detected from a bit stream of said output of the interface, and enables said write enable signal when said counted frame number equals an interval number at which I-frames are present.]

[14. An apparatus in accordance with claim 11, wherein said frame recording position controlling means includes:

a track number calculator for calculating a number of said specific tracks for recording said specific data and a number of tracks present between said specific tracks;

a multiplexing timing generator for generating said multiplexing timing signal based on an output from said track number calculator; and a multiplexer for selecting an output from said frame extracting means based on said generated multiplexing timing signal.]

[15. An apparatus in accordance with claim 14, wherein said frame recording position controlling means includes a bit stuffing circuit for filling insufficient data with bit streams or dummy bits when said selected output of the frame extracting means is at an underflow state.]

[16. An apparatus in accordance with claim 11, wherein said frame position information recording means includes:

a frame position recorder for receiving an output from said frame recording position controlling means and outputting position discrimination information to said digital recording means so as to record said position information of said specific tracks; and an index signal recorder for recording said index information on a control track of the magnetic tape, said index information including information indicating whether said specific tracks for said specific data are present.]

[17. An apparatus in accordance with claim 11, wherein said specific data includes I-frames, and said digital recording means includes a plurality of heads and switches for selectively recording said digital signals.]

[18. An apparatus in accordance with claim 11, wherein said digital recording means includes an interleaving and channel driving circuit, a plurality recording formatters, and a plurality of channel modulators, for formatting said digital signals so as to record said digital signals on the magnetic tape.]

[19. A method for controlling recording and reproduction in a video cassette tape recorder, comprising the steps of:

extracting specific data for a speed varied reproduction from compressed digital data;

calculating a number of tracks for recording said digital data and outputting a multiplexing timing signal based on said calculated number of tracks;

recording position information of specific tracks for the speed varied reproduction and index information on a magnetic tape based on said multiplexing timing signal;

recording digital signals including said digital data and said index information on the magnetic tape;

reproducing said digital signals recorded on the magnetic tape;

detecting said position information of the specific tracks for the speed varied reproduction and said index information;

controlling the speed of a capstan motor based on said detected index information and position information of the specific tracks; and removing unnecessary bit streams from said specific data.]

[20. A method in accordance with claim 19, wherein said specific data includes I-frames.]

[21. A method of controlling recording in a video cassette tape recorder, comprising the steps of:

extracting specific data for a speed-varied reproduction from compressed digital data;

generating a multiplexing timing signal and multiplexing said compressed digital data and said extracted specific data based on said multiplexing timing signal;

recording index information and position information of specific tracks for recording said specific data for the speed-varied reproduction on a magnetic tape based on said multiplexing timing signal; and recording digital signals including said multiplexed digital data and specific data on the magnetic tape.]

[22. A method in accordance with claim 21, wherein said generating step includes calculating a number of tracks for recording said digital data and generating said multiplexing timing signal based on said calculated number of tracks.]

*23. A method for processing digital data, the method performed by at least one device and comprising:*

*receiving the digital data,*

*wherein the digital data includes video data compressed as at least one of intra-frame and predictive frame, stuffing data capable of being detected and removed, synchronous signals, identification signals, and at least one relative position information associated with an I-frame, wherein the relative position information indicates position information associated with the I-frame relative to position information associated with a current frame;*

*detecting the synchronous signals and the identification signals for decoding the video data;*

*obtaining the video data from the digital data by removing the stuffing data based on stuffing code information;*

*determining a position associated with the I-frame by using the relative position information;*

*determining whether a speed-varied reproduction mode is selected for reproduction of the video data in a varied speed; and*

*reproducing the video data based on the determined position associated with the I-frame, the synchronous signals, the identification signals, and a result of the step of determining whether the speed-varied reproduction mode is selected.*

*24. The method of claim 23, wherein the digital data further includes index information indicating that the video data includes an I-frame, and the current frame includes video information and header information.*

*25. The method of claim 23, wherein the relative position information indicates a position difference between an area associated with the current frame and an area associated with the I-frame.*

*26. The method of claim 23, wherein the reproducing step reproduces the video data in a varied speed based on speed information when the speed-varied reproduction mode is selected, the speed-varied reproduction mode being associated with the speed information.*

*27. The method of claim 23, further comprising:*

*reproducing the video data in a normal speed if the determining step determines that the speed-varied reproduction mode is not selected.*

* * * * *